US007516880B1

(12) United States Patent
Crain et al.

(10) Patent No.: US 7,516,880 B1
(45) Date of Patent: Apr. 14, 2009

(54) MAILBOX/SHREDDER SYSTEM

(76) Inventors: Jason S. Crain, 1864 Goldenrod St., Sarasota, FL (US) 34239; Troy A. Zengel, P.O. Box 19115, Sarasota, FL (US) 34276

( * ) Notice: Subject to any disclaimer, the term of this patent is extended or adjusted under 35 U.S.C. 154(b) by 0 days.

(21) Appl. No.: 12/009,090

(22) Filed: Jan. 16, 2008

(51) Int. Cl.
*B65G 11/04* (2006.01)

(52) U.S. Cl. ............................ 232/45; 232/17; 232/30; 232/43.2; 241/100

(58) Field of Classification Search ............. 232/44–45, 232/47, 17, 30–32, 54, 63, 43.1–43.2; 220/209; 241/100, 101.01; D18/34.4–34.6
See application file for complete search history.

(56) References Cited

U.S. PATENT DOCUMENTS 3,059,839 A * 12/1962 Graber ........................ 232/44
3,682,402 A * 8/1972 Goldhammer .............. 241/100
4,873,811 A * 10/1989 Izumitani et al. ........... 53/139.1
4,964,579 A * 10/1990 Strohmeyer ................. 241/100
6,079,645 A 6/2000 Henreckson et al.
6,962,301 B1 11/2005 Chang
7,201,306 B1 4/2007 Lackey et al.
7,360,731 B2 * 4/2008 Easton et al. ............... 241/100
2006/0196926 A1 * 9/2006 Benson et al. .............. 235/375
2007/0295843 A1 * 12/2007 Smith .................... 241/101.01

* cited by examiner

*Primary Examiner*—William L. Miller

(57) ABSTRACT

A housing has a top, a bottom, sides, a back and a front. The housing has a primary chamber. The primary chamber receives unshredded mail. The housing has a secondary chamber. The secondary chamber receives shredded mail. A shredder is located in the housing above the secondary chamber. The shredder has controls to start and stop the shredder. A primary door is formed in the housing adjacent to the primary chamber. The primary door allows for adding mail to and removing unshredded mail from the upper chamber. A secondary door is formed in the housing adjacent to the secondary chamber. The secondary door allows for removing shredded mail from the secondary chamber.

6 Claims, 3 Drawing Sheets

FIG 3
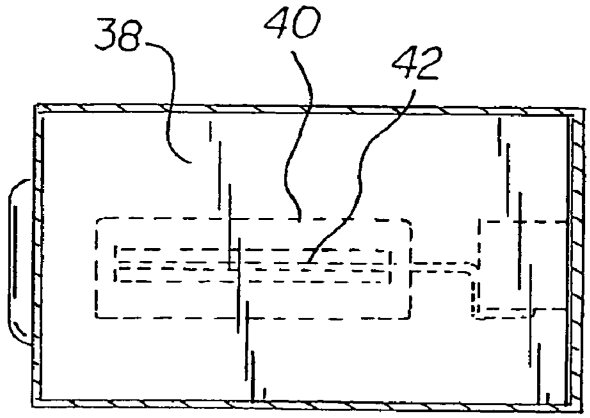
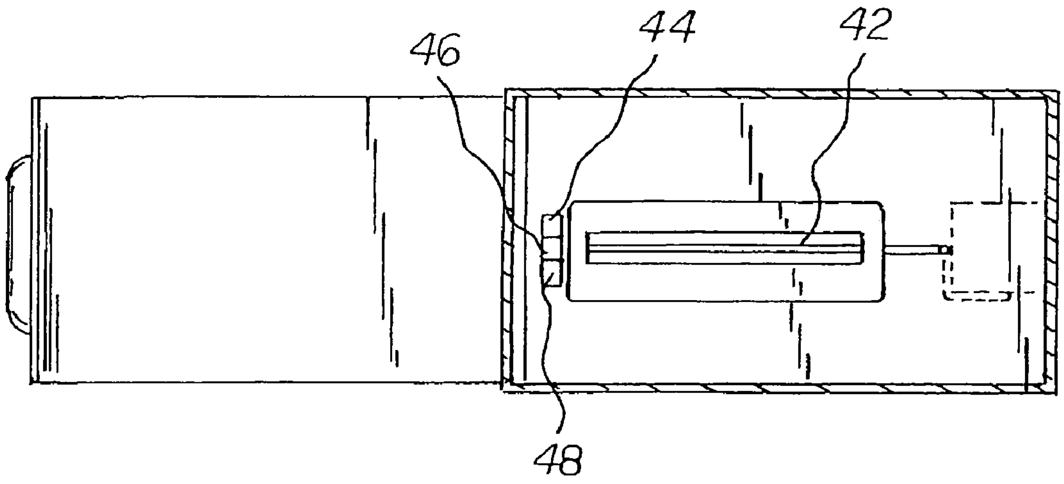
FIG 4

MAILBOX/SHREDDER SYSTEM

BACKGROUND OF THE INVENTION

1. Field of the Invention

The present invention relates to a mailbox/shredder system and more particularly pertains to promptly destroying unwanted mail following its receipt in a safe, convenient and economical manner.

2. Description of the Prior Art

The use of waste baskets of known designs and configurations is known in the prior art. More specifically, waste baskets of known designs and configurations previously devised and utilized for the purpose of disposing of unwanted mail through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,079,645 issued Jun. 27, 2000 to Henreckson et al relates to Desktop Shredders. U.S. Pat. No. 6,962,301 issued Nov. 8, 2005 to Chang relates to a Front-lifting Wastebasket for Paper Shredder Also Served as Garbage Bin. Lastly, U.S. Pat. No. 7,201,306 issued Apr. 10, 2007 to Lackey relates to a Multiple Purpose Newspaper Box.

While these devices fulfill their respective, particular objectives and requirements, the aforementioned patents do not describe a mailbox/shredder system that allows for promptly destroying unwanted mail following its receipt in a safe, convenient and economical manner.

In this respect, the mailbox/shredder system according to the present invention substantially departs from the conventional concepts and designs of the prior art, and in doing so provides an apparatus primarily developed for the purpose of promptly destroying unwanted mail following its receipt in a safe, convenient and economical manner.

Therefore, it can be appreciated that there exists a continuing need for a new and improved mailbox/shredder system which can be used for promptly destroying unwanted mail following its receipt in a safe, convenient and economical manner. In this regard, the present invention substantially fulfills this need.

SUMMARY OF THE INVENTION

In view of the foregoing disadvantages inherent in the known types of waste baskets of known designs and configurations now present in the prior art, the present invention provides an improved mailbox/shredder system. As such, the general purpose of the present invention, which will be described subsequently in greater detail, is to provide a new and improved mailbox/shredder system and method which has all the advantages of the prior art and none of the disadvantages.

To attain this, the present invention essentially comprises a mailbox/shredder system. First provided is a housing. The housing has a free top. The housing has a supporting bottom.

The housing also has a lateral wall. The lateral wall is provided between the top and the bottom. The housing has a closed back. The housing has parallel sides. The housing further has a front.

A primary upper chamber is provided in the housing. The upper chamber is bounded by the top and the sides and the front and the back. The upper chamber is adapted to receive and support unshredded mail.

A secondary lower chamber is provided in the housing. The lower chamber is bounded by the bottom and the sides and the front and the back. The lower chamber is adapted to receive and support shredded mail.

Provided next is a horizontally disposed separation wall. The separation wall is provided between the upper an lower chambers. A shredder is provided. The shredder is located in the separation wall. The shredder has a central opening. The central opening receives and feeds and shreds mail. The shredder has controls. The controls include a start component. The start components starts the shredder. In this manner mail is downwardly fed and shredded. The controls include a stop component. The stop component stops the shredder. The controls further include a reverse component. The reverse component reverses the direction of feed of the shredder.

A primary upper door is provided next. The upper door has a horizontal axis. The upper door is formed in the front of the housing adjacent to the upper chamber. The upper door is adapted to be pivoted by a user about the horizontal axis between a closed orientation and an open orientation. In the closed orientation access to the upper chamber and its contents is precluded. In this open orientation access to the upper chamber is allowed. In this manner mail may be added to and removed from the upper chamber.

Further provided is a secondary lower door. The lower door has a lock. The lower door has a vertical axis. The lower door is formed in one side wall of the housing adjacent to the lower chamber. A waste basket is provided. The waste basket is removably positioned within the lower chamber. The lower door is adapted to be pivoted by a user about the vertical axis between a closed orientation and an open orientation. In the closed orientation access to the lower chamber and its contents is precluded. In the open orientation access to the lower chamber and its contents is allowed.

Provided last are guide rails. The guide rails are formed in the sides between the upper and lower chambers immediately above the shredder. A horizontally disposed imperforate panel is provided. The panel is slidable in the guide rails. The panel has a handle. The handle is provided adjacent to the front of the housing between the upper and lower doors. In this manner the panel is adapted to be slid by a user between an interior orientation and an exterior orientation. In the interior orientation access to the shredder regardless of the orientation of the doors is precluded. In the exterior orientation access to the shredder when the upper door is in an open orientation is allowed. Also in this manner a user is allowed to open the upper door to retrieve mail and then if undesired mail is identified, to then first pull the panel to an exterior orientation, to then use the controls to start the shredder and to finally shred the undesired mail in a prompt manner. Further in this manner a user is allowed to unlock and open the lower door to dispose of undesired mail shredded by the shredder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mailbox/shredder system which has all of the advantages of the prior art waste baskets of known designs and configurations and none of the disadvantages.

It is another object of the present invention to provide a new and improved mailbox/shredder system which may be easily and efficiently manufactured and marketed.

It is further object of the present invention to provide a new and improved mailbox/shredder system which is of durable and reliable constructions.

An even further object of the present invention is to provide a new and improved mailbox/shredder system which is susceptible of a low cost of manufacture with regard to both materials and labor, and which accordingly is then susceptible of low prices of sale to the consuming public, thereby making such mailbox/shredder system economically available to the buying public.

Even still another object of the present invention is to provide a mailbox/shredder system for promptly destroying unwanted mail following its receipt in a safe, convenient and economical manner.

Lastly, it is an object of the present invention to provide a new and improved mailbox/shredder system. A housing has a top, a bottom, sides, a back and a front. The housing has a primary chamber. The primary chamber receives unshredded mail. The housing has a secondary chamber. The secondary chamber receives shredded mail. A shredder is located in the housing above the secondary chamber. The shredder has controls to start and stop the shredder. A primary door is formed in the housing adjacent to the primary chamber. The primary door allows for adding mail to and removing unshredded mail from the upper chamber. A secondary door is formed in the housing adjacent to the secondary chamber. The secondary door allows for removing shredded mail from the secondary chamber.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the system taken along line 3-3 of FIG. 2.

FIG. 4 is a plan view of the system shown in FIGS. 1 through 3.

The same reference numerals refer to the same parts throughout the various Figures.

DESCRIPTION OF THE PREFERRED EMBODIMENT

Figure 1:
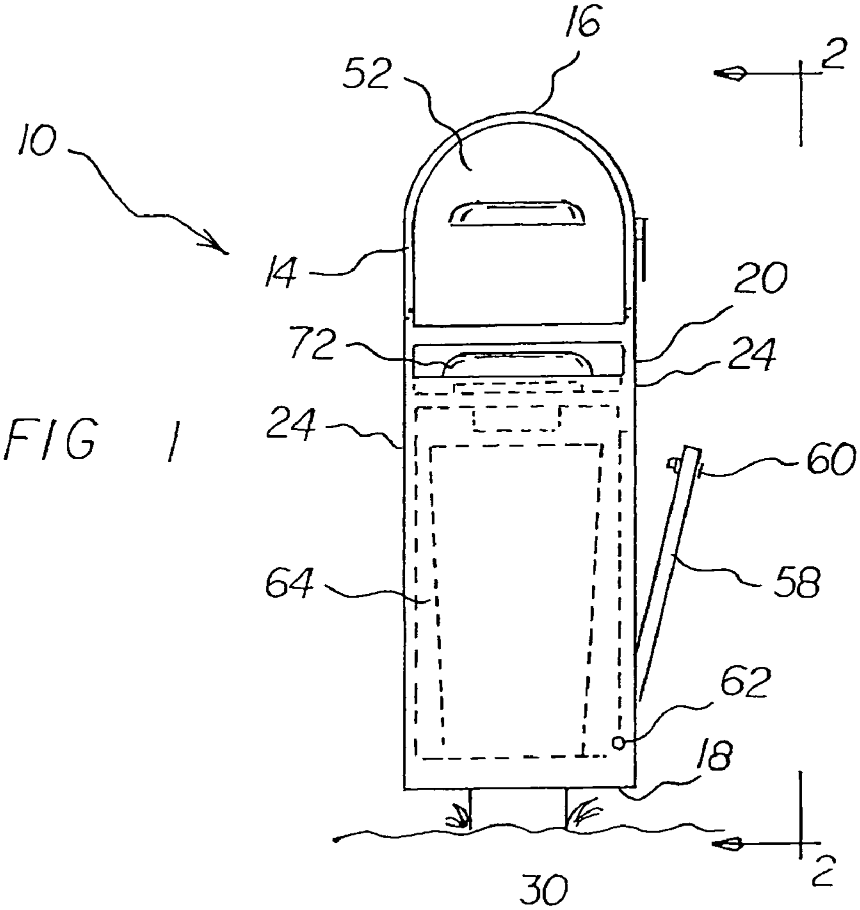
FIG. 1 is a front elevational view of a mailbox/shredder system constructed in accordance with the principles of the present invention.
Figure 2:
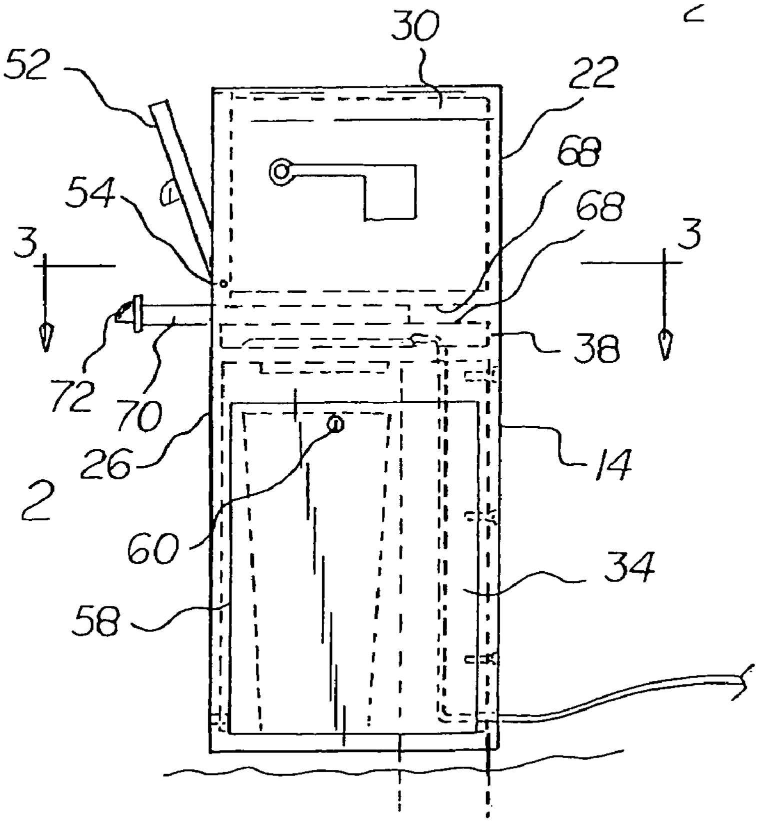
FIG. 2 is a side elevational view of the system taken along line 2-2 of FIG. 1.

With reference now to the drawings, and in particular to FIG. 1 thereof, the preferred embodiment of the new and improved mailbox/shredder system embodying the principles and concepts of the present invention and generally designated by the reference numeral 10 will be described.

The present invention, the mailbox/shredder system 10 is comprised of a plurality of components. Such components in their broadest context include a housing, a shredder, a primary door and a secondary door. Such components are individually configured and correlated with respect to each other so as to attain the desired objective.

First provided is a housing 14. The housing has a free top 16. The housing has a supporting bottom 18. The housing also has a lateral wall 20. The lateral wall is provided between the top and the bottom. The housing has a closed back 22. The housing has parallel sides 24. The housing further has a front 26.

A primary upper chamber 30 is provided in the housing. The upper chamber is bounded by the top and the sides and the front and the back. The upper chamber is adapted to receive and support unshredded mail.

A secondary lower chamber 34 is provided in the housing. The lower chamber is bounded by the bottom and the sides and the front and the back. The lower chamber is adapted to receive and support shredded mail.

Provided next is a horizontally disposed separation wall 38. The separation wall is provided between the upper an lower chambers. A shredder 40 is provided. The shredder is located in the separation wall. The shredder has a central opening 42. The central opening receives and feeds and shreds mail. The shredder has controls. The controls include a start component 44. The start components starts the shredder. In this manner mail is downwardly fed and shredded. The controls include a stop component 46. The stop component stops the shredder. The controls further include a reverse component 48. The reverse component reverses the direction of feed of the shredder.

A primary upper door 52 is provided next. The upper door has a horizontal axis 54. The upper door is formed in the front of the housing adjacent to the upper chamber. The upper door is adapted to be pivoted by a user about the horizontal axis between a closed orientation and an open orientation. In the closed orientation access to the upper chamber and its contents is precluded. In this open orientation access to the upper chamber is allowed. In this manner mail may be added to and removed from the upper chamber.

Further provided is a secondary lower door 58. The lower door has a lock 60. The lower door has a vertical axis 62. The lower door is formed in one side wall of the housing adjacent to the lower chamber. A waste basket 64 is provided. The waste basket is removably positioned within the lower chamber. The lower door is adapted to be pivoted by a user about the vertical axis between a closed orientation and an open orientation. In the closed orientation access to the lower chamber and its contents is precluded. In the open orientation access to the lower chamber and its contents is allowed.

Provided last are guide rails 68. The guide rails are formed in the sides between the upper and lower chambers immediately above the shredder. A horizontally disposed imperforate panel 70 is provided. The panel is slidable in the guide rails. The panel has a handle 72. The handle is provided adjacent to the front of the housing between the upper and lower doors. In this manner the panel is adapted to be slid by a user between an interior orientation and an exterior orientation. In the interior orientation access to the shredder regardless of the orientation of the doors is precluded. In the exterior orientation access to the shredder when the upper door is in an open orientation is allowed. Also in this manner a user is allowed to open the upper door to retrieve mail and then if undesired mail is identified, to then first pull the panel to an exterior orientation, to then use the controls to start the shredder and to finally shred the undesired mail in a prompt manner. Further in this manner a user is allowed to unlock and open the lower door to dispose of undesired mail shredded by the shredder.

Figure 5:
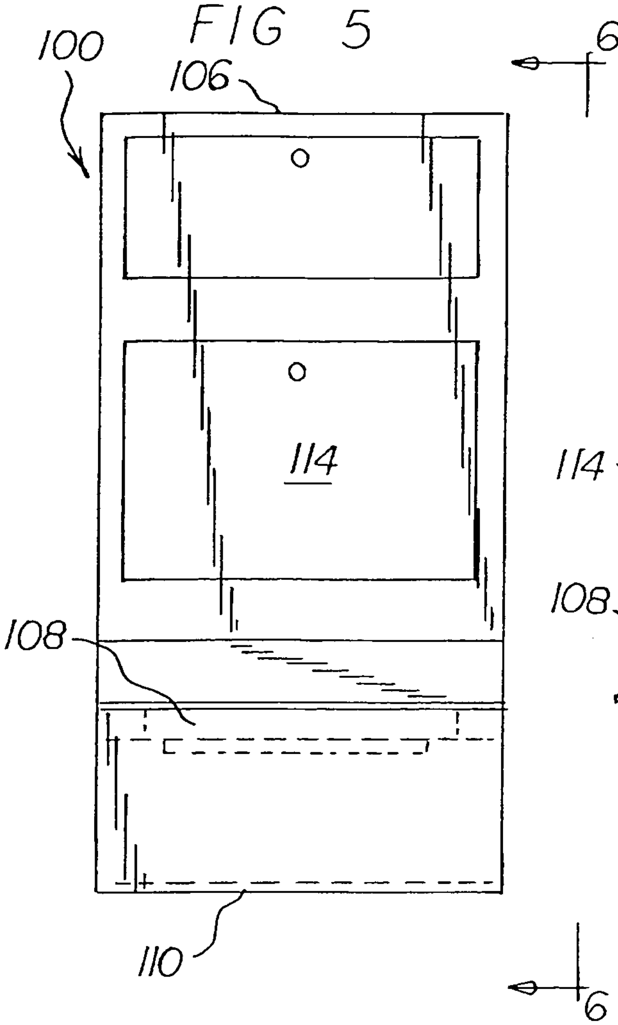
FIG. 5 is a front elevational view of a mailbox/shredder system constructed in accordance with the principles of an alternate embodiment of the present invention.
Figure 6:
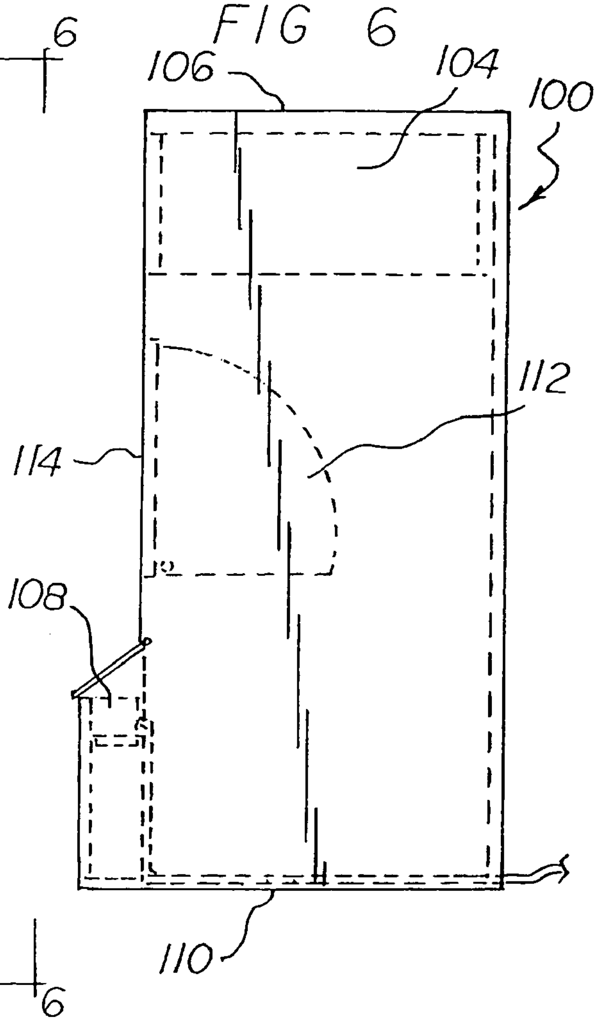
FIG. 6 is a side elevational view taken along line 6-6 of FIG. 5.

Note the alternate embodiment of the invention 100 as illustrated in FIGS. 5 and 6. A primary chamber 104 is provided. The housing has a top 106 and a bottom 110. The primary chamber is bounded above by the top of the housing. A secondary chamber 108 is provided. The is bounded below by the bottom of the housing. The secondary door provides access to the shredder. A tertiary chamber 112 is provided. A door 114 is provided. The tertiary chamber is located at an elevation intermediate the primary and secondary chambers.

Figure 7:
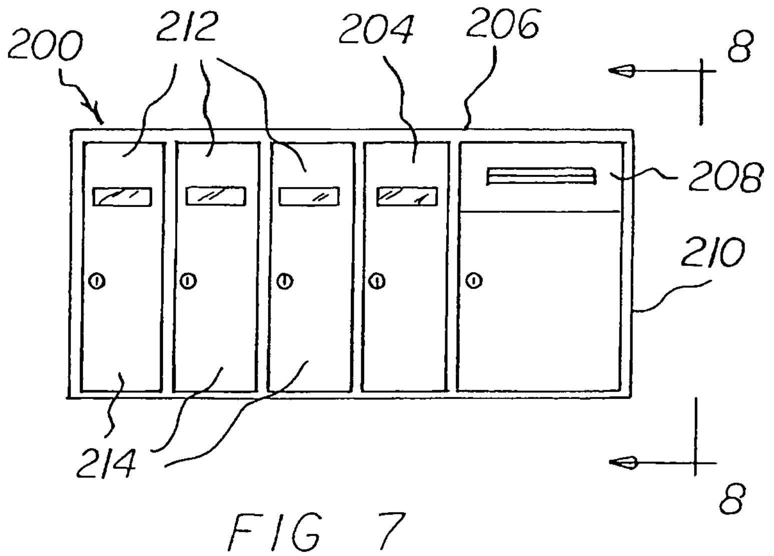
FIG. 7 is a front elevational view of a mailbox/shredder system constructed in accordance with the principles of a final alternate embodiment of the present invention.
Figure 8:
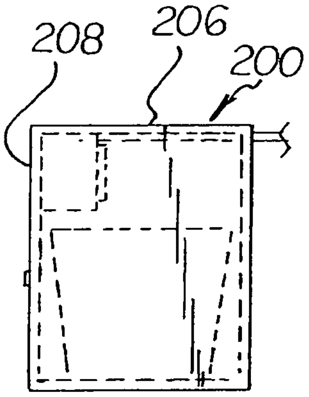
FIG. 8 is a side elevational view taken along line 8-8 of FIG. 7.

Note the alternate embodiment of the invention 200 as illustrated in FIGS. 7 and 8. A primary chamber 204 is provided. A housing 210 is provided. The housing has a top 206. The primary chamber is bounded above by the top of the housing. The secondary chamber is also bounded above by the top of the housing. The housing has a front 208. In this manner access is provided to the shredder oriented with its opening in a vertical plane. A plurality of tertiary chambers 212 and doors 214 with appropriate locks on all of the doors are provided. The tertiary chambers are located laterally disposed with respect to the primary and secondary chambers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination mailbox and shredder system comprising:

a housing having a top and a bottom and with sides and a back and a front;

the housing having a primary chamber for receiving and supporting incoming mail and a secondary chamber for receiving shredded mail;

a shredder located in the housing above the secondary chamber with controls to start and stop the shredder;

a primary door formed in the housing adjacent to the primary chamber to allow depositing the incoming mail and removing the incoming mail from the upper chamber;

a secondary door formed in the housing adjacent to the secondary chamber to allow removing shredded mail from the secondary chamber and a horizontally disposed imperforate panel movable between an interior orientation preventing communication between the primary and secondary chamber and an exterior orientation allowing communication between the primary and secondary chamber.

2. The system as set forth in claim 1 and further including:

guide rails formed in the sides between the primary and secondary chambers immediately above the shredder and the horizontally disposed imperforate panel slidable in the guide rails, the panel having a handle adjacent to the front of the housing between the doors whereby the panel is adapted to be slid by a user between the interior orientation for precluding access to the shredder regardless of the orientation of the doors and the exterior orientation for allowing access to the shredder when the upper door is in an open orientation.

3. The system as set forth in claim 1 wherein the shredder has an opening in a horizontal plane.

4. The system as set forth in claim 1 wherein the primary chamber is bounded above by the top of the housing and the secondary chamber is bounded below by the bottom of the housing.

5. The system as set forth in claim 1 and further including a waste basket in the secondary chamber.

6. A combination mailbox and shredder system for promptly destroying unwanted mail following its receipt in a safe, convenient and economical manner comprising, in combination:

a housing having a free top and a supporting bottom and a lateral wall between the top and the bottom, the lateral wall being formed with a closed back and parallel sides and a front;

a primary upper chamber formed in the housing bounded by the top and the sides and the front and the back, the upper chamber adapted to receive and support incoming mail;

a secondary lower chamber formed in the housing bounded by the bottom and the sides and the front and the back, the lower chamber adapted to receive shredded mail;

a horizontally disposed separation wall between the upper an lower chambers with a shredder located in the separation wall, the shredder having a central opening for receiving and feeding and shredding mail, the shredder having controls including a start component to start the shredder for downwardly feeding and shredding mail and a stop component to stop the shredder and a reverse component to reverse the direction of feed of the shredder;

a primary upper door with a horizontal axis formed in the front of the housing adjacent to the upper chamber and adapted to be pivoted by a user about the horizontal axis between a closed orientation to preclude access to the upper chamber and its contents an open orientation to allow access to the upper chamber for depositing the incoming mail, and for removing the incoming mail from, the upper chamber;

a secondary lower door with a lock and a vertical axis formed in one side wall of the housing adjacent to the lower chamber and a waste basket removably positioned within the lower chamber, the lower door adapted to be pivoted by a user about the vertical axis between a closed orientation to preclude access to the lower chamber and its contents and an open orientation to allow access to the lower chamber and its contents; and guide rails formed in the sides between the upper and lower chambers immediately above the shredder and a horizontally disposed imperforate panel slidable in the guide rails, the panel having a handle adjacent to the front of the housing between the upper and lower doors whereby the panel is adapted to be slid by a user between an interior orientation for precluding access to the shredder regardless of the orientation of the doors and an exterior orientation for allowing access to the shredder when the upper door is in an open orientation, the system thus allowing a user to open the upper door to retrieve mail and then if undesired mail is identified, to then first pull the panel to an exterior orientation, to then use the controls to start the shredder and to finally shred the undesired mail in a prompt manner, the system also thus allowing a user to unlock and open the lower door to dispose of undesired mail shredded by the shredder.

* * * * *